US009932272B2

(12) United States Patent
Chou et al.

(10) Patent No.: US 9,932,272 B2
(45) Date of Patent: Apr. 3, 2018

(54) COMPOSITIONS AND METHODS FOR MAKING LOW THERMAL EXPANSION CERAMIC BODIES

(71) Applicant: CORNING INCORPORATED, Corning, NY (US)

(72) Inventors: Kevin Ying Chou, Denver, NC (US); Sumalee L. Likitvanichkul, Painted Post, NY (US); Bryan Ray Wheaton, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 41 days.

(21) Appl. No.: 14/955,501

(22) Filed: Dec. 1, 2015

(65) Prior Publication Data

US 2016/0083297 A1  Mar. 24, 2016

Related U.S. Application Data

(62) Division of application No. 13/574,378, filed as application No. PCT/US2011/025223 on Feb. 17, 2011, now Pat. No. 9,227,875.

(60) Provisional application No. 61/307,964, filed on Feb. 25, 2010.

(51) Int. Cl.
| | |
|---|---|
| *C04B 35/195* | (2006.01) |
| *C04B 35/10* | (2006.01) |
| *C08K 3/22* | (2006.01) |
| *C04B 35/20* | (2006.01) |
| *C04B 35/626* | (2006.01) |
| *C04B 35/632* | (2006.01) |
| *C04B 35/636* | (2006.01) |
| *C04B 38/00* | (2006.01) |
| *C04B 111/00* | (2006.01) |

(52) U.S. Cl.
CPC .............. *C04B 35/20* (2013.01); *C04B 35/10* (2013.01); *C04B 35/195* (2013.01); *C04B 35/6261* (2013.01); *C04B 35/6263* (2013.01); *C04B 35/632* (2013.01); *C04B 35/6365* (2013.01); *C04B 38/0006* (2013.01); *C08K 3/22* (2013.01); *C04B 2111/00793* (2013.01); *C04B 2235/3217* (2013.01); *C04B 2235/3218* (2013.01); *C04B 2235/349* (2013.01); *C04B 2235/3418* (2013.01); *C04B 2235/3445* (2013.01); *C04B 2235/5296* (2013.01); *C04B 2235/5436* (2013.01); *C04B 2235/6021* (2013.01); *C04B 2235/78* (2013.01); *C04B 2235/9607* (2013.01); *C08K 2003/2227* (2013.01)

(58) Field of Classification Search
CPC ....... C04B 35/10; C04B 35/195; C04B 35/20; C04B 35/632; C04B 35/6365; C04B 35/6261; C04B 35/6263; C04B 38/0006; C04B 2235/78; C04B 2235/9607; C04B 2235/5436; C04B 2235/6021; C04B 2235/5296; C04B 2235/3445; C04B 2235/3418; C04B 2235/3217; C04B 2235/3218; C04B 2235/349; C04B 2111/00793; C08K 3/22; C08K 2003/2227

See application file for complete search history.

(56) References Cited

U.S. PATENT DOCUMENTS

| | | | |
|---|---|---|---|
| 5,824,143 A | 10/1998 | Chalasani et al. | |
| 6,300,266 B1 | 10/2001 | Beall et al. | |
| 6,319,870 B1 * | 11/2001 | Beall .................. | C04B 35/6263 428/116 |
| 6,677,261 B1 | 1/2004 | Addiego et al. | |
| 7,309,371 B2 * | 12/2007 | Merkel ................ | C04B 35/195 55/282.2 |
| 7,887,897 B2 * | 2/2011 | Lu ........................ | C04B 35/195 428/116 |
| 9,227,875 B2 * | 1/2016 | Chou .................... | C04B 35/195 |
| 2004/0261384 A1 | 12/2004 | Merkel et al. | |
| 2005/0109241 A1 | 5/2005 | Addiego et al. | |
| 2008/0050557 A1 | 2/2008 | Beall et al. | |
| 2008/0050887 A1 | 2/2008 | Chen et al. | |
| 2009/0130217 A1 * | 5/2009 | Roesch ................ | A61K 8/0241 424/489 |
| 2013/0116110 A1 * | 5/2013 | Bronfenbrenner .... | C04B 35/195 501/141 |
| 2016/0083297 A1 * | 3/2016 | Chou .................... | C04B 35/195 501/119 |
| 2017/0301903 A1 * | 10/2017 | Choi .................... | H01M 2/1686 |
| 2017/0313628 A1 * | 11/2017 | Noguchi .............. | C04B 38/0012 |

FOREIGN PATENT DOCUMENTS

| | | |
|---|---|---|
| EP | 1979290 | 7/2010 |
| EP | 1657039 | 8/2014 |
| JP | 2000-301516 | 10/2000 |
| WO | 2005018893 A1 | 3/2005 |
| WO | 2007075333 A2 | 5/2007 |
| WO | 2008027219 A2 | 3/2008 |
| WO | 2009032119 A2 | 3/2009 |

OTHER PUBLICATIONS

Corn.312.40EP—Application No. 11706988.01351 dated Feb. 26, 2015—Office Action revealing prior art.
"NSP Powderizer". Sturtevant, Inc. Hanover, MA: 1999.
"Methocel Cellulose Ethers Technical Handbook". Dow Chemical Company: 2002.
EP application No. 11706988.0-1371, dated Feb. 26, 2016, Communication pursuant to Article 94(3) EPC, pp. 1-5.

\* cited by examiner

*Primary Examiner* — David M Brunsman

(57) ABSTRACT

Comminuted pre-mixtures for technical ceramics production, and ceramic bodies made therefrom, the comminuted pre-mixtures being comprised of cellulosic components and alumina source components and the bodies being produced by compounding the comminuted pre-mixtures with powdered inorganic components into batch mixtures, adding liquids to the batch mixtures to form plastic batches, forming the plastic batches into shaped bodies, and heating the shaped bodies to form the ceramic bodies.

19 Claims, 1 Drawing Sheet

COMPOSITIONS AND METHODS FOR MAKING LOW THERMAL EXPANSION CERAMIC BODIES

CROSS REFERENCE TO RELATED APPLICATIONS

This application is a divisional of and claims the benefit of priority to U.S. patent application Ser. No. 13/574,378, filed on Jul. 20, 2012, now U.S. Pat. No. 9,227,875, which is a 35 U.S.C. § 371 National Stage Entry of and claims the benefit of priority to International Patent Application No. PCT/US11/25223, filed on Feb. 17, 2011, which claims the benefit of priority to U.S. Provisional Patent Application No. 61/307,964, filed on Feb. 25, 2010, all of which are relied upon and hereby incorporated by reference for all purposes as if fully set forth herein.

FIELD

The present disclosure relates to the manufacture of low thermal expansion ceramic bodies, including compositions and methods for making low thermal expansion cordierite ceramic bodies, such as refractory cordierite honeycomb bodies of the types used for the treatment of exhaust effluents from motor vehicles.

BACKGROUND

Cordierite ceramic honeycombs are widely used as catalyst supports in catalytic converters for the removal of carbon monoxide, nitrogen oxides and unburned hydrocarbons from gasoline engine exhaust gases, and for the trapping of particulates present in diesel engine exhaust gases. A key factor influencing the thermal durability of cordierite substrates or filters to be used in harsh engine exhaust environments is the coefficient of thermal expansion (CTE) of the material. Under extreme temperature cycling conditions such as commonly encountered in engine exhaust systems during use, the substrate is subjected to high thermal stresses induced by thermal gradients.

SUMMARY

The present disclosure encompasses novel batch mixtures for the manufacture of ceramic products such as cordierite products, and methods for making such products utilizing such mixtures. Hence, in one aspect, the disclosure provides a method for making a ceramic body comprising the step of compounding a comminuted pre-mixture with one or more inorganic components into a batch mixture. The pre-mixture is comprised of a cellulosic component and an alumina source component. A liquid is then added to the batch mixture to form a plasticizable or plasticized batch, the resulting plasticizable or plasticized batch is thereafter formed into a shaped body, and the shaped body is then heated to form the ceramic body.

In other aspects, the present disclosure includes batch mixtures useful for the production of ceramic bodies, particularly including for example ceramic honeycombs comprised predominantly of cordierite. In particular embodiments, the batch mixtures comprise powdered sources of magnesia, alumina and silica in combination with a cellulosic binder component, with at least a portion of the mixture being comprised of a comminuted pre-mixture consisting essentially of a cellulosic component and a powdered source of alumina. In accordance with some of these embodiments, the alumina source component in the pre-mixture is a hydrous alumina powder such as, for example, aluminum hydroxide or aluminum oxyhydroxide, and in some embodiments boehmite or pseudoboehmite, such as in the form of a deagglomerated boehmite or pseudoboehmite.

In still other aspects the present disclosure encompasses novel comminuted pre-mixtures useful for compounding the disclosed batch mixtures and for the practice of the disclosed methods. In particular embodiments, those pre-mixtures comprise powder blends consisting essentially of a cellulose ether powder component and a deagglomerated boehmite powder component.

As hereinafter more fully described, pre-mixtures formulated as disclosed herein have been found to impart beneficial properties to both the disclosed plasticizable or plasticized batch mixtures and ceramic bodies formed through the heating of such batch mixtures. In particular embodiments, the elastic properties of the plasticizable or plasticized batch mixtures are improved, and the thermal expansion coefficients of the ceramic bodies are reduced.

BRIEF DESCRIPTION OF THE DRAWINGS

The disclosed methods and compositions are further described below with reference to the appended drawings.

DETAILED DESCRIPTION

Figure 1:
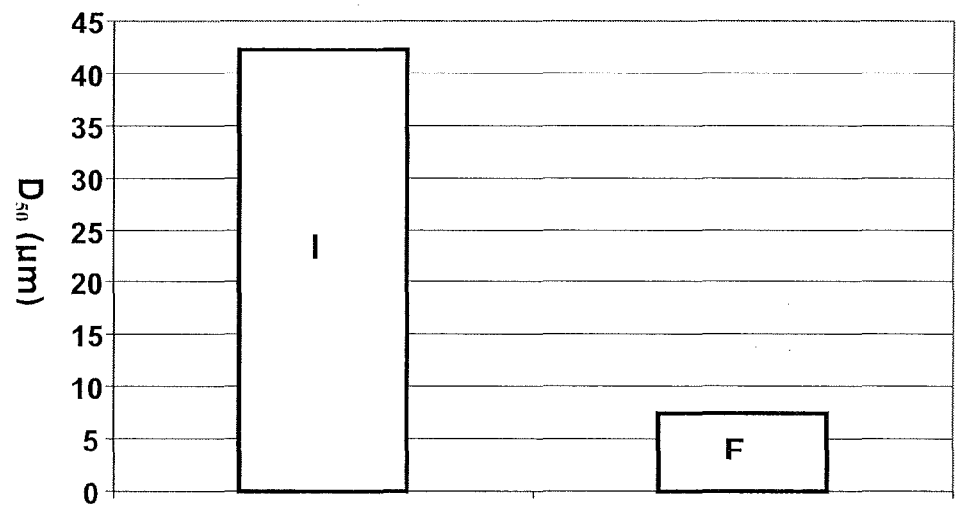
FIG. 1 is a graph comparing the particle sizes of selected cellulose alumina mixtures.

The methods disclosed herein, as well as the batch mixtures and pre-mixtures employed for use in practice of those methods, are found to be useful for the production of a wide variety of ceramic products that include alumina or aluminous crystal phases and that utilize sources of alumina, such as powdered sources of alumina, for their production. In some aspects, the present methods and mixtures offer particular advantages for the manufacture of cordierite ceramics, particularly including cordierite honeycombs, the latter being especially valued for high strength and refractoriness as well as for the high geometric surface areas that can be secured in honeycomb structures of high cell density and low wall thickness. Accordingly, the following descriptions and examples include specific references to the manufacture of such ceramics and honeycombs even though the disclosed methods and compositions are not necessarily limited thereto.

Securing the advantages to be derived from the practice of the disclosed methods depends on preparation of the disclosed comminuted pre-mixtures. Prior to compounding the selected batch mixture, the selected cellulosic component is first mixed with the selected alumina source component to form a first mixture, and then the first mixture is suitably comminuted to form the pre-mixture.

Comminution of the first mixture can be effectively carried out utilizing a particle grinding device such as a powderizer or micronizer. Such grinding equipment is commercially available, examples thereof including powderizers capable of reducing larger particulates to sub-millimeter particle sizes, i.e., particle sizes in the micrometer range. In particular embodiments secured through the use of such equipment, comminuted pre-mixtures have been processed to produce a mean particle size not exceeding about 25 μm, and in some embodiments not exceeding about 10 μm.

The cellulosic component utilized for the preparation of the pre-mixture should be a relatively dry powder. Powders having a free adsorbed water contents not exceeding 5 weight percent, such as less than or equal to 3 wt %, or less than or equal to 2 wt %, are examples of materials useful for the purpose. While not intending to be bound by theory, present data suggests that at least some of the cellulosic component, or even a substantial proportion of the particles of the cellulosic component can be substantially covered with at least some particles of the alumina source component in appropriately comminuted pre-mixtures.

The addition of a liquid to the disclosed powders to produce a plasticizable or plasticized batch mixture can be accomplished using conventional techniques. The liquid can be added to the inorganic components and pre-mixture during the compounding step, or in addition or alternatively, is added after that compounding has been substantially completed.

As noted above, the methods and mixtures provided in accordance with the present disclosure can be employed with particular advantage for the production of cordierite ceramic bodies, particularly including cordierite honeycomb bodies. A useful method for making a cordierite ceramic body comprises compounding a batch mixture wherein the inorganic components are selected from the group consisting of sources of magnesia, alumina and silica, with these being introduced in powder form and in proportions such that the resulting ceramic body is composed primarily of cordierite. To secure the aforementioned properties improvements in selected embodiments of such cordierite products, the sources of alumina in the batch mixture will include the alumina source or sources present in the comminuted pre-mixture of the cellulosic component and alumina. A suitable cellulosic component is a cellulose ether of the variety previously used to plasticize cordierite powder batches for honeycomb production, e.g., methyl cellulose, ethyl cellulose, propyl cellulose, hydroxypropyl cellulose, hydroxypropyl methyl cellulose, hydroxyethyl methyl cellulose, ethylhydroxy ethyl cellulose, hydroxybutyl cellulose, hydroxybutyl methyl cellulose, sodium carboxy methyl cellulose, and the like.

In particular embodiments adapted for the production of cordierite honeycombs, the alumina present in the pre-mixture is a hydrous alumina. For the purpose of the present description hydrous aluminas include hydroxyl- or bound-water-containing aluminum compounds such as aluminum hydroxide, aluminum oxyhydroxide, and mineral or synthesized mineral forms thereof including boehmite and pseudo-boehmite.

The liquid added to the powder mixtures to form the plasticizable or plasticized batch is generally an aqueous liquid, i.e., a water or water-based vehicle. Where the cordierite body to be produced by shaping the plasticized batch is a cordierite honeycomb, shaping is carried out by extruding the plastic batch mixture through a honeycomb die. Various types of extruders can be used for that purpose, but embodiments of the disclosed methods wherein the batch is extruded through an extruder comprising at least one extruder screw, for example an extruder comprising two or more screws such as a twin screw extruder, are efficient and effective.

Following the shaping step, the shaped body is heated to produce the ceramic body. Particular embodiments of the heating step include those comprising first drying the shaped body, and then firing the dried shaped body at a temperature and for a time at least sufficient to form the cordierite or other selected crystalline phase in the ceramic body.

The inclusion of boehmite or other fine or hydrous aluminas in batch mixtures for the manufacture of cordierite ceramic honeycombs has proven to be advantageous, particularly for ultra-thinwall (UTW) honeycomb production, providing relatively high strengths and low expansion coefficients in the fired ware. Fine aluminas including de-agglomerated or even liquid-dispersed boehmites can be used for such purposes Known methods of utilizing such alumina sources are conventionally employed by introducing the alumina source alone into inorganic powder mixtures together with other inorganic powders such as clay, talc or silica. That is, such powders are conventionally dry blended together with other batch constituents including dry organics such as cellulosic binders, etc. Such blending is then followed by the introduction of a selected aqueous vehicle and any other wet ingredients such as liquid lubricants, with blending of the wet and dry ingredients being carried out, for example by Littleford mixing, prior to feeding the blend to an extruder. As reflected by the following working examples, such practices do not result in the improvements in batch plasticity or the reductions in fired body thermal expansion coefficients that have been secured through the use of the above-described comminuted alumina-cellulose pre-mixtures disclosed herein.

EXAMPLES

A number of plasticized powder batches having properties suitable for the extrusion of cordierite ceramic honeycombs were prepared for evaluation. Each of the batches comprised a mixture of clays, talc, aluminas, silica, a cellulosic binder, and oil-based lubricants and surfactant-type batch lubricants. Conventional batches were prepared for comparison with batches provided in accordance with the disclosure and were compounded in accordance with standard practice by combining all dry ingredients, including the alumina and cellulosic binder components, in a Littleford mixer, then adding the water vehicle and the oil-based liquids with mixing to form moist liquid-powder blends, and finally delivering the blends to a twin-screw extruder for plasticization and extrusion forming into wet honeycomb extrudates. The wet extrudates were then dried and fired to provide cordierite honeycombs having cell densities of 600 cells/in$^2$ and cell wall thicknesses of approximately 100 μm.

Batches provided in accordance with the present disclosure were similarly formulated and prepared, but the required boehmite alumina and cellulosic binder components were pre-mixed and comminuted prior to introduction into the batches. For that purpose the boehmite and cellulose binder components were introduced together into a first Littleford mixer and blended to produce a homogeneous cellulose binder-boehmite alumina mixture. The resulting mixture was then processed through a powderizer to de-agglomerate the boehmite in the presence of the cellulose binder, thus to provide a comminuted pre-mixture comprising the two components. The pre-mixture was then combined with the remaining dry ingredients in a second Littleford mixer for mixing and subsequent blending with the water vehicle and other liquids.

The boehmite deagglomeration occurring during the powderizing step of pre-mixture processing is considered to be at least partly responsible for the significant reduction in mean particle size that is found to result from that processing. FIG. 1 of the drawings presents a graph comparing the mean particle size $D_{50}$ (in micrometers) of a boehmite-cellulose mixture prior to powderizing (the vertical bar marked I) with the mean particle size of the final pre-mixture measured after powderizing (the vertical bar marked F). A mean particle size reduction from an initial value in excess of 40 µm to a final or powderized mean particle size below 10 µm is measured.

Table 1 below reports compositions for comparative and inventive batches produced as above described. First listed in Table 1 are the proportions of each of the inorganic powdered talcs, clays, aluminas and silica constituting the sources of magnesia, alumina and silica for developing a primary cordierite crystal phase in the fired honeycomb products. Those proportions are reported in parts by weight, but totaling 100 parts by weight and thus approximating weight percent values for each of the powders in the inorganic powder portion of the final batches.

The proportions of the water and added organic constituents in the batch compositions, including the cellulose ether binder and the oils, are reported in parts by weight in excess of the combined weights of the inorganic powders. For each of the comminuted pre-mixtures provided in inventive Examples 1-3 in Table 1, the reported weights are simply the combined weights of the boehmite alumina and cellulose ether binder components present in the corresponding comparative examples C1-C3 in the Table.

TABLE 1

Cordierite Honeycomb Batch Compositions

|  | C1 | Example 1 | C2 | Example 2 | C3 | Example 3 |
|---|---|---|---|---|---|---|
| Inorganic Components (Median Particle Size in µm) | | | | | | |
| Talc 1 (5.5) (morphology index 0.88) | 39.95 | 39.95 | 39.76 | 39.76 | | |
| Talc 2 (8.5) | | | | | 29.82 | 29.82 |
| Talc 3 (1.5) (morphology index 0.65) | | | | | 9.94 | 9.94 |
| Calcined Clay (2.8) | 24.73 | 24.73 | 17.1 | 17.1 | 17.1 | 17.1 |
| Hydrous Clay (6.1) | 16.55 | 16.55 | 16.58 | 16.58 | 16.58 | 16.58 |
| Alumina 1 (0.5) | 5.73 | 5.73 | 9.51 | 9.51 | | |
| Alumina 2 (3.0) | | | | | 9.51 | 9.51 |
| Boehmite (0.1) | 11.04 | — | 11.05 | — | 11.05 | — |
| Silica (4.5) | 2 | 2 | 6 | 6 | 6 | 6 |
| Dry Organics (excess parts by wt) | | | | | | |
| Cellulose ether binder | 5.4 | — | 5.4 | — | 5.4 | — |
| Boehmite-cellulose Pre-mixture | — | 16.44 | — | 16.45 | — | 16.45 |
| Liquid Organics (excess parts by weight) | | | | | | |
| Polyalphaolefin oil | 6.3 | 6.3 | 6.7 | 6.7 | 6.7 | 6.7 |
| Tall oil | 0.8 | 0.8 | 0.82 | 0.82 | 0.82 | 0.82 |
| Water (excess parts by weight) | 33 | 33 | 33 | 33 | 26.5 | 26 |

Note to Table 1:
the cellulose ether binder is Dow F240 Methocel ® hydroxypropyl methylcellulose from Dow Chemical, Midland, MI, USA Several cordierite honeycomb samples prepared from each of the batch compositions reported in Table 1 by extrusion, drying and firing as above described were evaluated to determine the effects of the reported batch composition and processing changes on the thermal expansion and other properties of the resulting fired cordierite honeycombs.

Table 2 below reports representative results of thermal expansion evaluations conducted on those samples.

Included in Table 2 for each of the inventive batch samples (Example 1-Example 3) and corresponding comparative batch samples (C1-C3) from Table 1 are the average coefficients of thermal expansion (CTEs) calculated from thermal expansion curves for the fired samples generated during the expansion testing of the samples over the temperature range from about 25° C. to 800° C. Both the heating (expansion) curves and the cooling (contraction) curves for each sample were recorded and evaluated. The heating and cooling results reported for Example 1 and comparative example C1 in Table 2 are averages of the results from the testing of five fired honeycomb samples, while the results for each of Examples 2 and 3 and corresponding comparative examples C2 and C3 are averages from three fired samples. All CTE values are reported in conventional units of length/unit length ($\times 10^{-7}/°$ C.).

TABLE 2

Cordierite Honeycombs - Thermal Expansion Coefficients

| Sample Identification (Table 1) | C1 | Example 1 | 2C | Example 2 | 3C | Example 3 |
|---|---|---|---|---|---|---|
| Heating CTEs (25-800° C.) | 2.82 | −0.84 | 1.03 | −0.57 | 0.3 | −0.3 |
| Cooling CTE (25-800° C.) | 2.7 | −1.24 | 0.8 | −0.73 | 0.13 | −0.63 |

As the data in Table 2 reflect, the CTEs of the fired honeycombs produced from the inventive batch mixtures (Examples 1-3) in Table 1 are lower in each case than the CTEs recorded for their respective comparative batch mixtures (C1-C3). Significant increases in the resistance of the fired honeycombs to thermal shock breakage are projected to result from those decreases notwithstanding the somewhat higher microcracking levels and somewhat lower MOR values measured on the inventive samples. As to other effects of the disclosed composition and processing changes, honeycomb wall porosities and median pore diameters are only slightly changed in the inventive samples, and the concentrations of minor crystal phases developed during honeycomb firing are not significantly different. Finally, I-ratio evaluations of those samples indicate that the c-axes of the cordierite crystals are well oriented within the planes of the webs, with some preferential alignment of those axes perpendicular to the extrusion direction of the honeycombs also being observed.

Further advantages attending the use of the methods and batch mixtures disclosed herein include a significant improvement in the tensile cohesiveness of the plasticized batches. Evaluations of the extent of that improvement are carried out by preparing fully plasticized batches of inventive Example 1 and comparative example C1 as reported in Table 1 above, and comparing the tensile breakage strains of the two plasticized mixtures.

Batch mixtures of Example 1 and comparative example C1 were prepared by mixing as above described. They were then charged into a Brabender mixer to work and plasticize the mixtures, with the same total mixing energy being applied to each of the two batches. The plasticized mixtures were then diced, recombined, and again diced to form cubes 0.25 inches in size, and the cubed samples of each mixture were then compacted under a 1000-kg force to produce 250-gram billets. The resulting billets were then extruded through a ribbon die to produce ribbon samples of each mixture for tensile testing.

Instron tensile testing of the ribbon samples produced from each plasticized mixture shows that the peak tensile loads at breakage for the two materials were similar. However the ribbon samples made from the inventive Example 1 batch exhibited a substantially higher strain at break than the ribbon samples made from comparative batch C1.

Figure 2:
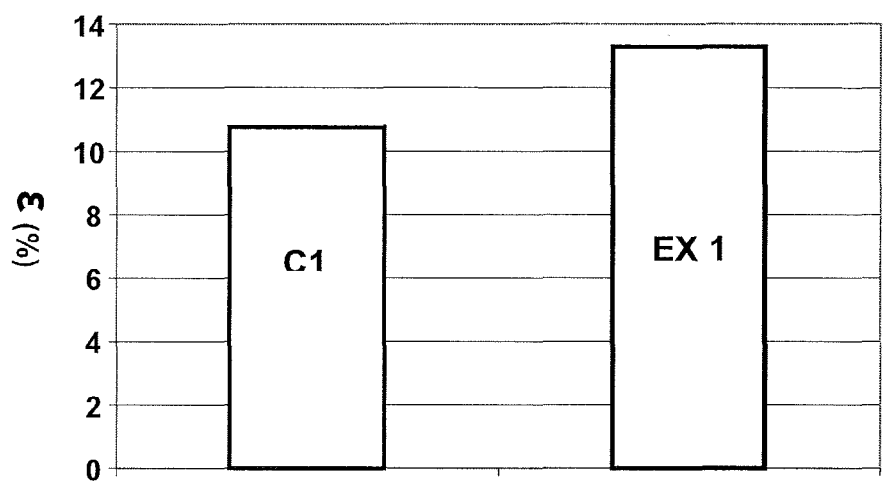
FIG. 2 is a graph comparing the tensile properties of plasticized ceramic batch mixtures.

Representative results of the described Instron tensile tests are reported in FIG. 2 of the drawings. FIG. 2 presents a bar graph comparing the tensile strains $\epsilon$ at breakage, in percent elongation, for ribbons formed of the two sample plasticized batches. The strain levels are represented by the relative heights of the vertical bars for the comparative sample (bar C1) and for the inventive sample (bar Ex 1).

From data such as presented in FIG. 2 it has been confirmed that an increase of approximately 30% in tensile breakage strain for plasticized cordierite batch mixtures incorporating comminuted cellulose-boehmite pre-mixtures in accordance with the present disclosure can be achieved. The beneficial effects of such improvements can be several, including reductions extrusion defects such as extrudate checks and fissures, decreases in cell distortion defects, and improved honeycomb extrudate skin-forming characteristics. Adding to the economic value of these effects is the fact that comparisons of pressure sensor data collected from the twin-screw extrusion forming of these batch mixtures show no significant changes in extrusion torques or extrusion die pressures resulting from the use of the inventive mixtures.

The methods and batches disclosed herein can be useful to achieve lower CTEs, such as for honeycomb bodies wherein the honeycomb channel or cell walls have thicknesses below about 200 μm, or even below 150 μm, some of which may have cell densities in the range of 400-1200 cells/in$^2$ of honeycomb cross-section transverse to the direction of channel orientation While the methods and materials encompassed within the scope of the present disclosure have been described above with reference to particular embodiments thereof, it will be recognized that those embodiments are merely illustrative, and that many adaptations of those particularly disclosed methods and materials may be advantageously applied to a wide variety of new and existing applications within the scope of the appended claims.

What is claimed is:

1. A powder batch mixture for a cordierite ceramic body comprising powdered sources of magnesia, alumina and silica in combination with a cellulose ether binder, wherein at least a portion of the powdered source of alumina is introduced into the batch mixture as a comminuted powder pre-mixture consisting essentially of deagglomerated hydrous alumina powder and cellulose ether binder.

2. The powder batch mixture of claim 1 wherein the comminuted powder pre-mixture has a mean particle size not exceeding 25 μm.

3. The powder batch mixture of claim 1 wherein at least some of the cellulose ether binder is substantially covered with the deagglomerated hydrous alumina powder.

4. The powder batch mixture of claim 1 wherein the hydrous alumina powder is selected from the group consisting of aluminum hydroxide, boehmite and pseudo-boehmite.

5. The powder batch mixture of claim 1 wherein the cellulose ether binder is selected from the group consisting of methyl cellulose, ethyl cellulose, propyl cellulose, hydroxypropyl cellulose, hydroxypropyl methyl cellulose, hydroxyethyl methyl cellulose, ethylhydroxy ethyl cellulose, hydroxybutyl cellulose, hydroxybutyl methyl cellulose, and sodium carboxy methyl cellulose.

6. The powder batch mixture of claim 1 wherein the hydrous alumina powder comprises boehmite.

7. The powder batch mixture of claim 1 wherein the hydrous alumina powder is selected from the group consisting of aluminum hydroxide and aluminum oxyhydroxide.

8. A comminuted powder blend consisting essentially of a deagglomerated hydrous alumina powder component and a cellulose ether powder component.

9. The comminuted powder blend of claim 8 having a mean particle size not exceeding 25 μm.

10. The comminuted powder blend of claim 8 wherein at least some of the cellulose ether binder is substantially covered with the deagglomerated hydrous alumina powder.

11. The comminuted powder blend of claim 8 wherein the hydrous alumina powder is selected from the group consisting of aluminum hydroxide, boehmite and pseudo-boehmite.

12. The comminuted powder blend of claim 8 wherein the cellulose ether binder is selected from the group consisting of methyl cellulose, ethyl cellulose, propyl cellulose, hydroxypropyl cellulose, hydroxypropyl methyl cellulose, hydroxyethyl methyl cellulose, ethylhydroxy ethyl cellulose, hydroxybutyl cellulose, hydroxybutyl methyl cellulose, and sodium carboxy methyl cellulose.

13. The comminuted powder blend of claim 8 wherein the hydrous alumina powder comprises boehmite.

14. The comminuted powder blend of claim 8 wherein the hydrous alumina powder is selected from the group consisting of aluminum hydroxide and aluminum oxyhydroxide.

15. A powder batch mixture for a cordierite ceramic body comprising powdered sources of magnesia, alumina and silica in combination with a cellulose ether binder,
wherein at least a portion of the powdered source of alumina is introduced into the batch mixture as a comminuted powder pre-mixture consisting essentially of deagglomerated hydrous alumina powder and cellulose ether binder,
wherein the comminuted powder pre-mixture has a mean particle size not exceeding 25 μm, and
wherein at least some of the cellulose ether binder is substantially covered with the deagglomerated hydrous alumina powder.

16. The powder batch mixture of claim 15 wherein the hydrous alumina powder is selected from the group consisting of aluminum hydroxide, boehmite and pseudo-boehmite.

17. The powder batch mixture of claim 15 wherein the hydrous alumina powder comprises boehmite.

18. The powder batch mixture of claim 15 wherein the cellulose ether binder is selected from the group consisting of methyl cellulose, ethyl cellulose, propyl cellulose, hydroxypropyl cellulose, hydroxypropyl methyl cellulose, hydroxyethyl methyl cellulose, ethylhydroxy ethyl cellulose, hydroxybutyl cellulose, hydroxybutyl methyl cellulose, and sodium carboxy methyl cellulose.

19. The powder batch mixture of claim 15 wherein the hydrous alumina powder is selected from the group consisting of aluminum hydroxide and aluminum oxyhydroxide.

* * * * *